United States Patent
Shah

(10) Patent No.: US 9,470,857 B2
(45) Date of Patent: Oct. 18, 2016

(54) OPTICAL MODULE WITH BEAM SPLITTER ON REFLECTING SURFACE

(71) Applicant: Sumitomo Electric Industries, Ltd., Osaka-shi (JP)

(72) Inventor: Jignesh Shah, San Jose, CA (US)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 42 days.

(21) Appl. No.: 14/304,486

(22) Filed: Jun. 13, 2014

(65) Prior Publication Data
US 2015/0362685 A1 Dec. 17, 2015

(51) Int. Cl.
*G02B 6/42* (2006.01)

(52) U.S. Cl.
CPC .......... *G02B 6/4246* (2013.01); *G02B 6/4214* (2013.01); *G02B 6/4206* (2013.01); *G02B 6/4286* (2013.01); *G02B 6/4292* (2013.01)

(58) Field of Classification Search
CPC .... G02B 6/4214; G02B 6/4212; G02B 6/42; G02B 6/4204; G02B 6/12004; G02B 6/0073; G02B 19/0061; G02B 2006/12104; H01L 33/60

See application file for complete search history.

(56) References Cited

U.S. PATENT DOCUMENTS

| 6,888,988 | B2 | 5/2005 | Vancoille et al. | |
|---|---|---|---|---|
| 2004/0258354 | A1* | 12/2004 | Sekiya | G02B 6/32 385/35 |
| 2007/0146881 | A1* | 6/2007 | Tanaka | G02B 6/4246 359/485.06 |
| 2009/0154877 | A1 | 6/2009 | Morioka | |
| 2010/0232465 | A1* | 9/2010 | Tsukiji | H01S 5/0425 372/45.01 |
| 2013/0259421 | A1* | 10/2013 | Yamakami | B29D 11/00721 385/14 |
| 2014/0140657 | A1* | 5/2014 | Shiraishi | G02B 6/42 385/14 |

FOREIGN PATENT DOCUMENTS

JP 2007-171427 A 7/2007
JP 2012-194372 A 10/2012

* cited by examiner

*Primary Examiner* — Thomas A Hollweg
*Assistant Examiner* — Mary A El Shammaa
(74) *Attorney, Agent, or Firm* — Venable LLP; Michael A. Sartori; F. Brock Riggs

(57) ABSTRACT

An optical module providing laser diodes (LD) and monitor PDs is disclosed. The LDs and monitor PDs are mounted on a module substrate that also mounts a resin body. The resin body includes a mirror surface which causes a total inner reflection for the optical beams coming from the LDs toward the inner fibers set in one side of the resin body. The mirror surface further provides a blip to refract portions of the optical beams toward the monitor PDs.

13 Claims, 8 Drawing Sheets

OPTICAL MODULE WITH BEAM SPLITTER ON REFLECTING SURFACE

TECHNICAL FIELD

The present application relates to an optical module that provides a beam splitter on a reflecting mirror to bend an optical axis from a vertical cavity surface emitting laser diode (hereafter denote as VCSEL) by substantially a right angle.

BACKGROUND

Various techniques have been known in the field to split an optical beam coming from a VCSEL mounted on a reference plane in order to monitor statuses of the VCSEL through the split beam. Japanese Patent Applications laid open Nos. of 2012-194372A and 2007-171427A, and a United States Patent Application Publication US2009/0154877 A1 have disclosed such techniques.

However, conventional techniques require complicated structure in the shell covering the VCSEL to guide the split optical beam toward a monitoring photodiode (hereafter denoted as PD) which is mounted also on the reference plane. Simple and reliable means have been requested for a long time.

SUMMARY

One aspect of the present application relates to an optical module. The optical module according to an embodiment includes a substrate, a vertical cavity surface emitting laser diode (VCSEL) mounted on the substrate, a monitor photodiode (PD) mounted on the substrate, and a resin body mounted on the substrate. The resin body installs the VCSEL and the monitor PD therein, and provides a mirror surface which makes an angle of 45° against the substrate to cause a total inner reflection for an optical beam coming from the VCSEL.

A feature of the embodiment is that the mirror surface includes at least one blip that refracts a portion of the optical beam toward the monitor PD.

Another aspect of the present application relates to an optical transceiver that includes a motherboard, an optical receptacle, an optical module installing a plurality of optical sources, and inner fibers to couple the optical module with the optical receptacle. The motherboard provides an opening in a center portion thereof, into which the optical module is set. The optical receptacle receives an external optical connector. The optical module is electrically connected to the circuit board with a flexible printed circuit (FPC) board.

A feature of the optical transceiver according to the embodiment is that the optical module includes, a module substrate, a plurality of VCSELs mounted on the module substrate as respective optical sources, a plurality of monitor PDs arranged aside of the VCSELs on the module substrate, and a resin body mounted on the module substrate to install the VCSELs and the monitor PDs therein. The resin body provides a mirror surface that reflects optical beams each output from the VCSELs toward the inner fibers coupled in one side of the resin body and refracts portions of the optical beams toward the monitor PDs.

BRIEF DESCRIPTION OF THE DRAWINGS

The foregoing and other purposes, aspects and advantages will be better understood from the following detailed description of a preferred embodiment of the invention with reference to the drawings, in which:

FIG. 4 illustrates optical axes from the VCSEL to a monitor photodiode and to an external optical fiber;

DETAILED DESCRIPTION

Next, some preferred embodiments according to the present invention will be described. In the description of the drawings, numerals or symbols same or similar to each other will refer to elements same or similar to each other without overlapping explanations.

Figure 1:
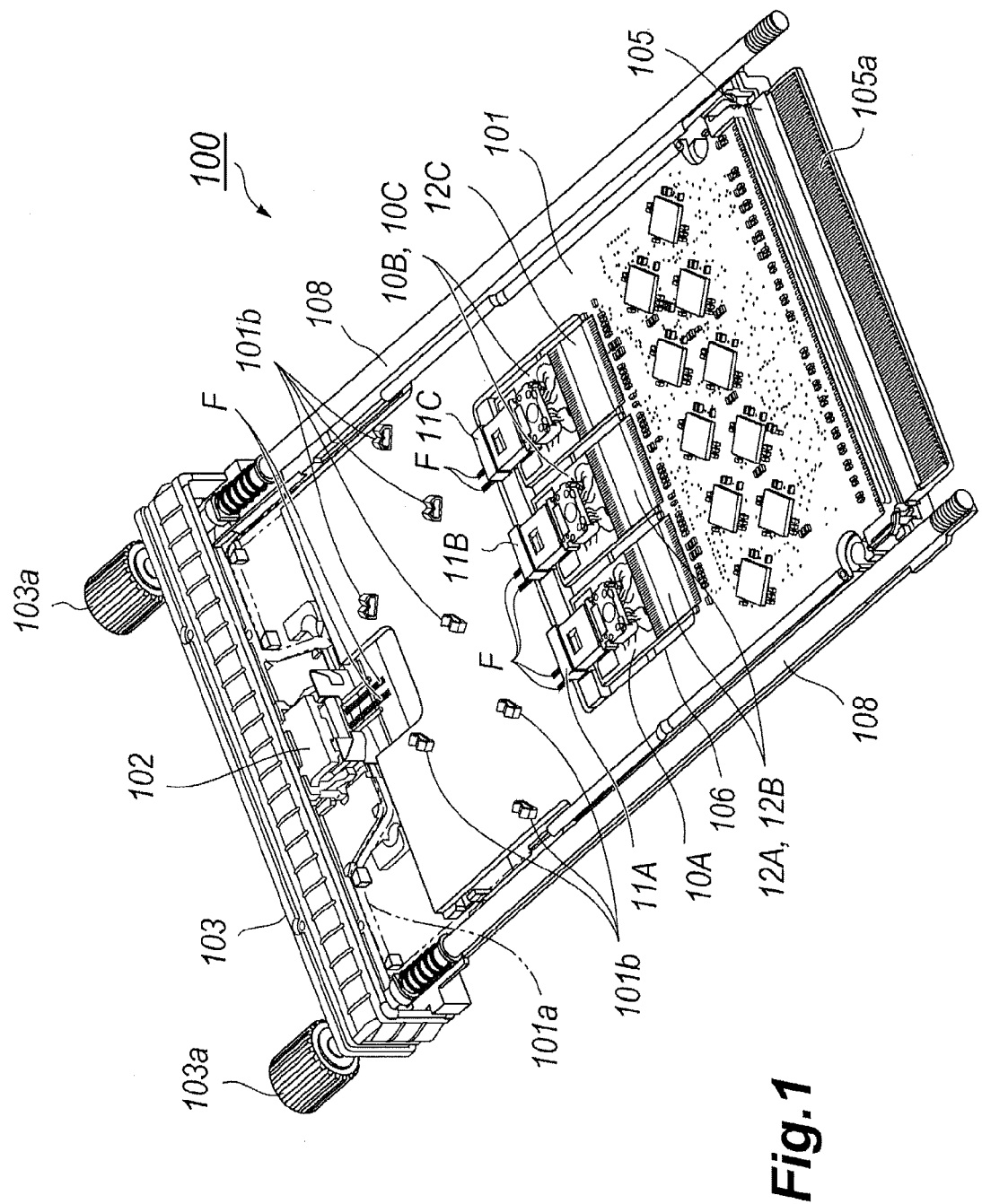
FIG. 1 is a perspective view showing an inside of an optical transceiver installing a sub-module according to an embodiment of the present invention.

FIG. 1 is a perspective view showing an inside of an optical transceiver 100 according to an embodiment of the present applications. The optical transceiver shown in FIG. 1 is a type of, what is called, a Centum gigabit Form Factor Pluggable (hereafter denoted as CFP) optical transceiver, where details of the physical dimensions, and electronic and optical specifications are defined in one of multi-source agreements (MSA). The optical transceiver 100 provides electronic circuits on the motherboard 101, and an optical receptacle 102 as one of optical components in the front panel 103. The optical receptacle 102 of the present embodiment has a type of, what is called, the MT-connector where a plurality of optical fibers are secured, and exposes the cavity thereof at the front panel 103. The cavity receives an external MT connector.

The motherboard 101 is independent of a plug board 105 provided in the rear end of the optical transceiver 100. In the description below, directions of the front, rear, top and bottom are referred to only for the explanation sake, and do not restrict the scope of the present invention at all. The plug board 105 provides electronic plugs 105a to be mated with an electrical connector provided in a host board on which the optical transceiver 100 is set. The optical transceiver 100 further provides the fastening bars 108 in respective sides of the circuit board 101, where the bars 108 in the rear end thereof mate with screw holes provided in the electrical connector on the host system by rotating the knob 103a after the optical transceiver 100 is mated with the host connector. Thus, the optical transceiver 100 may be plugged with the host system to communicate with the host system electrically.

The optical transceiver 100 of the embodiment further provides a plurality of sub-modules, 10A to 10C, where each of the sub-modules, 10A to 10C, is set in the opening 106 in a center of the motherboard 101. The sub-modules, 10A to 10C, optically couple with the optical receptacle 102 by a plurality of inner fibers F, which are not fully illustrated in FIG. 1, through respective MT connectors, 11A to 11C. The sub-modules, 10A to 10C, as described above, are independent of the motherboard 101, respective flexible printed circuit (hereafter denoted as FPC) boards, 12A to 12C, electrically connect them with the motherboard 101. The FPC boards, 12A to 12C, effectively absorb stresses caused through the MD connectors, 11A to 11C. The motherboard 101 further provides many hooks 101b. The inner fibers F are arranged within the housing by hooking with the hooks 101b. Peripheries of the motherboard 101 are surrounded by an elastic gasket 101a to shield the inside of the housing electrically. FIG. 1 illustrates only a lower housing on which optical and electrical components are mounted. By covering the lower housing with an upper housing as setting the gasket 101a therebetween in the peripheries, the inside of the housing may be effectively shielded.

Figure 2:
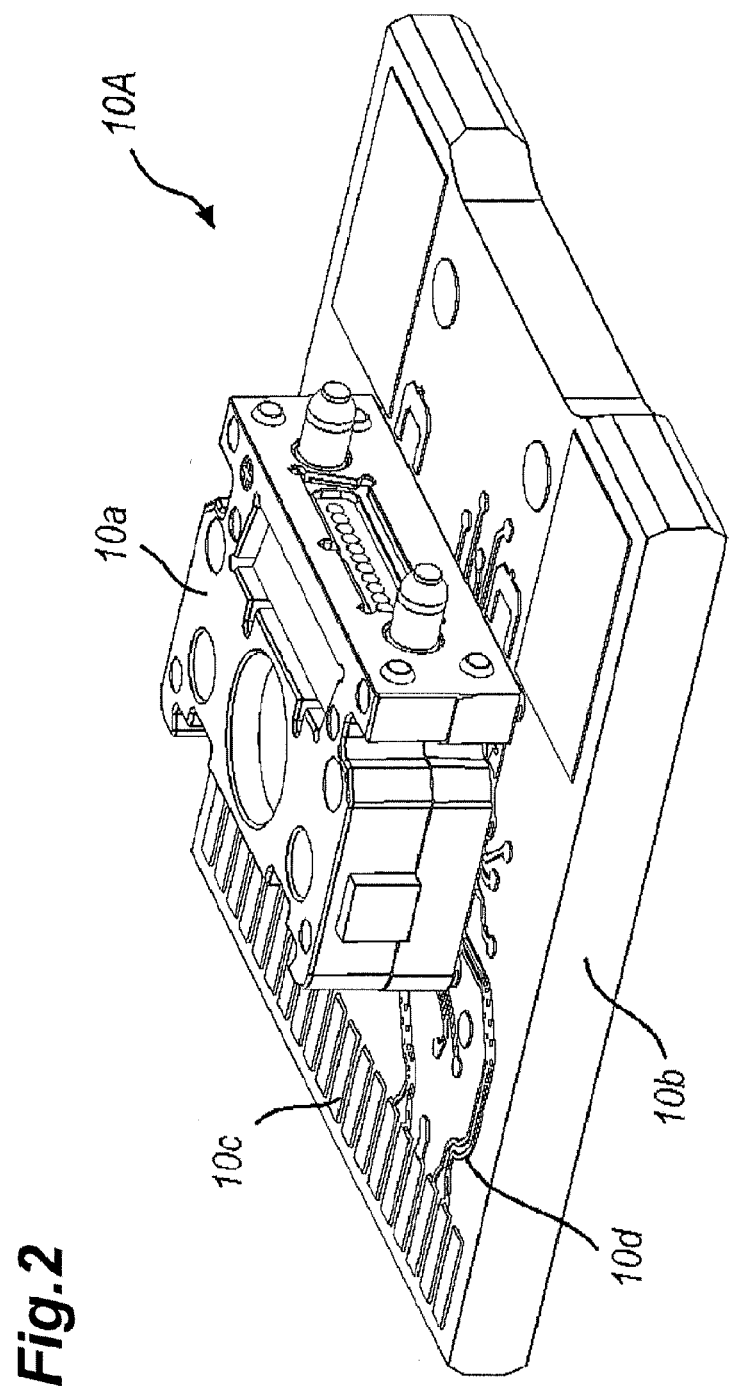
FIG. 2 is a perspective view of the sub-module.

FIG. 2 illustrates the sub-module 10A but omits the MT connector 11A and the FPC board 12A. The sub-module 10A provides a resin body 10a and a module substrate 10b mounting the resin body 10a, and optical and electrical devices thereon. The resin body 10a covers the optical and electrical devices on the module substrate 10b. The module substrate 10b also provides a plurality of electrodes 10c along the rear edge and interconnections 10d electrically connecting the electrodes 10c with the devices in the resin body 10a. The sub-module 10A may be electrically coupled with the motherboard 101 via the FPC board 12A connected to the electrodes 10e on both of the top and bottom surface of the module substrate 10b. That is, the module substrate 10b is a type of the multi-layered circuit board with interconnections in the top, the bottom, and the intermediate surfaces. The electrodes 10c are formed in both of the top and the bottom surfaces where the FPC boards 12A are connected thereto. The sub-modules 1013 and 10C have same configuration as the sub-module 10A described above and below.

Referring to FIG. 1 again, the optical transceiver 100 provides three (3) sub-modules, 10A to 10C. However, the present invention does not limit the number of sub-modules. The optical transceiver 100 may install four or more sub-modules, or two or lesser sub-modules in the housing.

Next, further details of the sub-module 10 will be described.

Figure 3A:
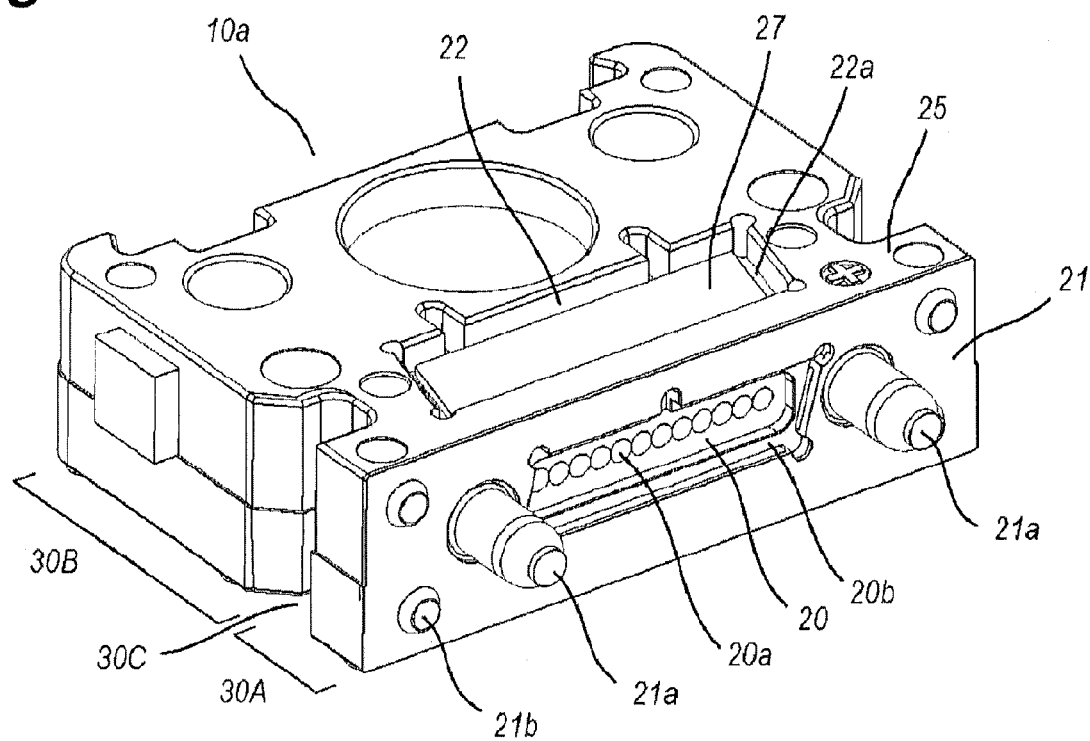
FIGS. 3A and 3B show a sub-module viewed from the front top and the front bottom, respectively.

FIG. 3A is a perspective view of a resin body 10a, in particular, FIG. 3A magnifies the resin body 10a of the sub-module 10A according to an embodiment of the invention. The sub-module 10A shown in FIGS. 1 to 3 is, what is called, a parallel sub-module capable of transmitting a plurality of optical signals.

The resin body 10a primarily includes an optical section 30A and an electrical section 30B. Two sections, 30A and 30B, are separated by a cut 30C in both sides of the resin body 10a. The optical section 30A installs a plurality of semiconductor light emitting devices, in particular, the sub-module 10A of the present embodiment installs vertical cavity surface emitting lasers (hereafter denoted as "VCSEL") in an arrayed form in the optical section 30A. The VCSELs are arranged in an array on a module board 10b. The module board 10b also mounts a plurality of monitor photodiodes (hereafter denoted as "m-PD") also in an arrayed form and other PDs for receiving optical signals provided through the inner fibers F. That is, the VCSELs and PDs are mounted on the module board 10b such that the VCSELs and m-PDs form two lines parallel to each other along a lateral direction of the sub-module 10A, while, the VCSELs and the PDs are arranged in side-by-side. Details of the optical section 30A will be described later.

The electrical section 30B installs circuits to drive VCSELs and/or to amplify electrical signals output from the PDs. Because the embodiment shown in the figures installs four (4) VCSELs accompanied with four (4) m-PDs, and four (4) PDs for the optical signals, the same number of the drivers and the amplifiers are implemented in the sub-module 10A. The embodiment provides the drivers and the amplifiers in an integrated form, namely, four drivers are monolithically integrated on a single device and four amplifiers are integrated on another device, and these devices are installed in a second cavity 26 provided in the electronic section 30B of the resin body 10a. The rear end of the second cavity 26 is partially opened to extend the interconnections therethrough.

The optical section 30A includes a front surface 21, the bottom surface 24, and a top surface 25. The front surface 21 exposes an optical port 20 in substantially a center thereof. Twelve lenses 20a are exposed within the optical port 20 in the arrayed arrangement. The lens array 20a may be integrally formed with a resin body 10a. A pair of guide pins 21a is provided in respective sides of the optical port 20 to align the MT-connector optically coupled with the optical port 20, or lenses 20a. Respective corners of the front wall 21 provide smaller projections 21b to make a space against the front surface of the MT connector coupling with the sub-module 10A. That is, a protruding length of the smaller projections 21b from the front surface 21 determines a distance from the top of the lenses 20a to the front surface of the MT connector at which the tips of the optical fibers are exposed.

The optical port 20 provides a step 20b with a rectangular shape with rounded corners, while, the edge of the optical port 20 is a parallelogram with four circles in respective corners. The step 20b may set an optical attenuator in a slab form thereof. The VCSELs commercially available often show a scattered performance, in particular, the scattered emission efficiency against the driving current. The arrayed VCSELs mounted on respective module substrates 10b, even when their driving is carried out in electrical conditions substantially same with others, the optical output power of respective VCSELs may sometimes widely vary. The control of the optical output power by the driving condition electrically, namely, to adjust the magnitude of the driving current is undesirable from the viewpoint of the high frequency performance of the VCSEL. Accordingly, another technique except for those electrical adjustments is necessary. The present sub-modules, 10A to 10C, may set an optical attenuator on the step 20b in the optical port 20 that effectively attenuates the optical power output from the port 20 in the unit of the sub-modules, 10A to 10c.

Figure 3B:
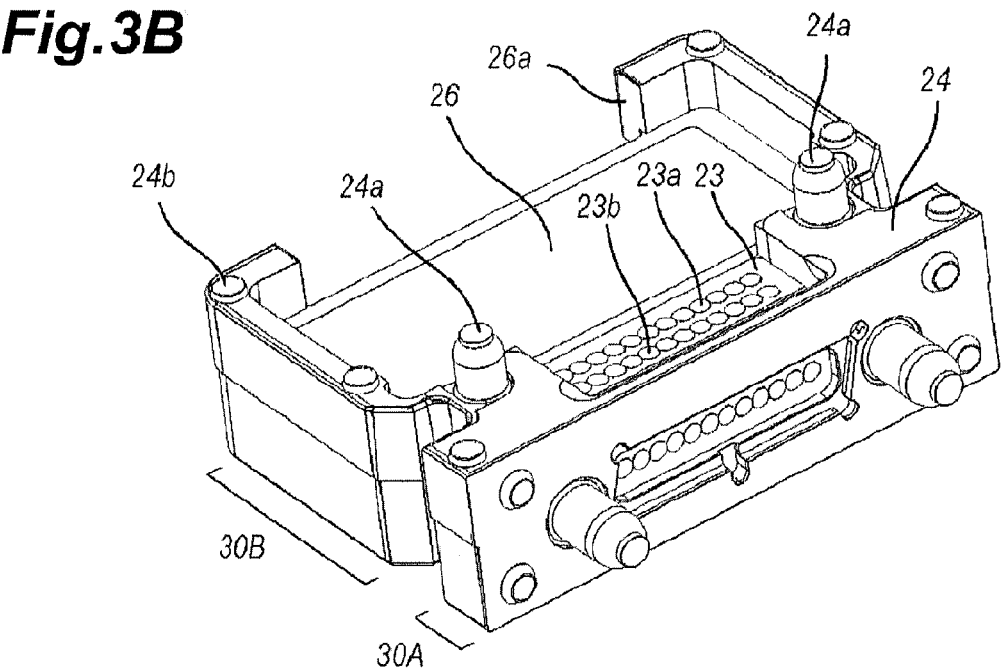

Referring to FIG. 3B, which is the bottom view of the resin body 10a, the bottom of the optical section 30A provides the first pocket 23, in which optical devices of an arrayed VCSELs, m-PDs, and PDs are installed. The VCSEL array and the m-PDs laterally extend in the arrayed direction but front and back longitudinally. That is, the VCSELs and the m-PDs make two lines extending laterally along a direction perpendicular to the optical axis of the MT connector to be coupled with the sub-module 10A; while, the arrayed VCSELs and the PDs are arranged in side-by-side along the lateral direction. The deep end of the first pocket 23, namely, the ceiling thereof, provides two lens arrays, 23a and 23b, where they also extend laterally. The lens array 23b close to the front surface 21 faces the m-PDs, while, the other lens array 23a faces the VCSELs. These two lens arrays, 23a and 23b, may be integrally formed with the resin body 10a similar to the lens array 20a formed in the optical port 20.

As already described, the sub-module 10A of the present embodiment is a type of optical transmitter/receiver assembly providing four VCSELS, four m-PDs, and four PDs.

Four VCSELs and four m-PDs are arranged as described above corresponding to two-lined lens array, while, PDs for receiving optical signals form the inner fibers F are arranged along the first lens array 23a. That is, four lenses in the first lens array 23a face the VCSEL, while, other four lenses also in the first lens array 23a face the PDs.

Referring to FIG. 3B, a rear of the sub-module 10A is illustrated. Most of the rear portion of the resin body 10a is provided for the electronic section 30B including the second pocket 26. The second pocket 26 receives and covers the drivers to drive the VCSELs and the amplifiers to amplify electrical signals output from respective PDs. The second pocket 26 may further provide a circuit to control the optical output power of the VCSELs, which is often called as the automatic-power-control (APC) circuit by receiving the outputs from the mPDs and controlling the driving currents supplied to the VCSELs. The APC circuit may integrate four circuits each corresponding to respective VCSELs. In an alternative, the drivers, the amplifiers, and the APC circuits are independently provided for respective VCSELs and PDs. The rear end of the second pocket 26 is opened to pull out interconnections from those circuits installed in the second pocket 26.

Two guide pins 24a protrudes from the bottom surface 24 in both sides of the first pocket 23. The guide pins 24a align the resin body 10a with respect to the module substrate 10b. That is, the VCSELs, the m-PDs, and the PDs are mounted on the module substrate 10b by referring to alignment marks provided on the top of the module substrate 10b. The alignment marks are aligned with the position of holes into which the guide pins 24a are inserted. Thus, the devices on the module substrate 10b are optically aligned with the resin body 10a.

The bottom surface 24 of the resin body 10a further provides terraces 24b in respective corners of the optical section 30A and the electrical section 30B. The terraces 24b in tops thereof abut against the top surface of the module substrate 10b when the resin body 10a set thereon. The terraces 24b make a gap against the top surface of the module substrate 10b. That is, the first and second pockets, 23 and 26, of the resin body 10a, in addition to the rear opening 26a thereof, are opened for the ambient. In other words, the optical devices of the VCSELs 10e, the m-PDs 10f, the PDs 10h, and the electronic devices 10g, where they are mounted on the module substrate 10b, are not air-tightly shield.

Figure 3C:
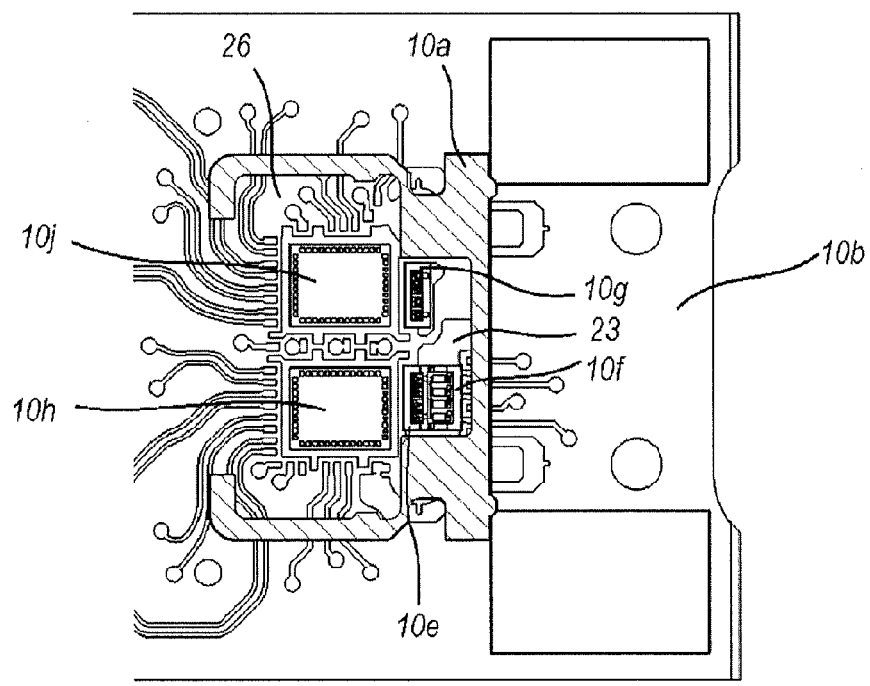
FIG. 3C is a plan view showing an inside of the sub-module.

FIG. 3C is a plan view of the module substrate 10b mounting the optical and electrical devices, 10e to 10j, and the resin body 10a which is cut to show the first and second pockets, 23 and 26. As described, the VCSEL array 10e and the mPDs 10f are arranged in front and rear; while, the VCSEL array 10e and the PDs 10f are arranged in side by side as facing the first lenses 23a. Those optical devices, 10e to 10g, are mounted in the first pocket 23. Mounted behind the VCSEL array 10e is the driver 10h, while, the amplifier 10j is mounted behind the PDs 10g. Both electronic devices, 10h and 10j, are set within the second pocket 26 of the resin body 10a. The rear end of the second pocket 26 is opened through which interconnections pass.

Figure 4:
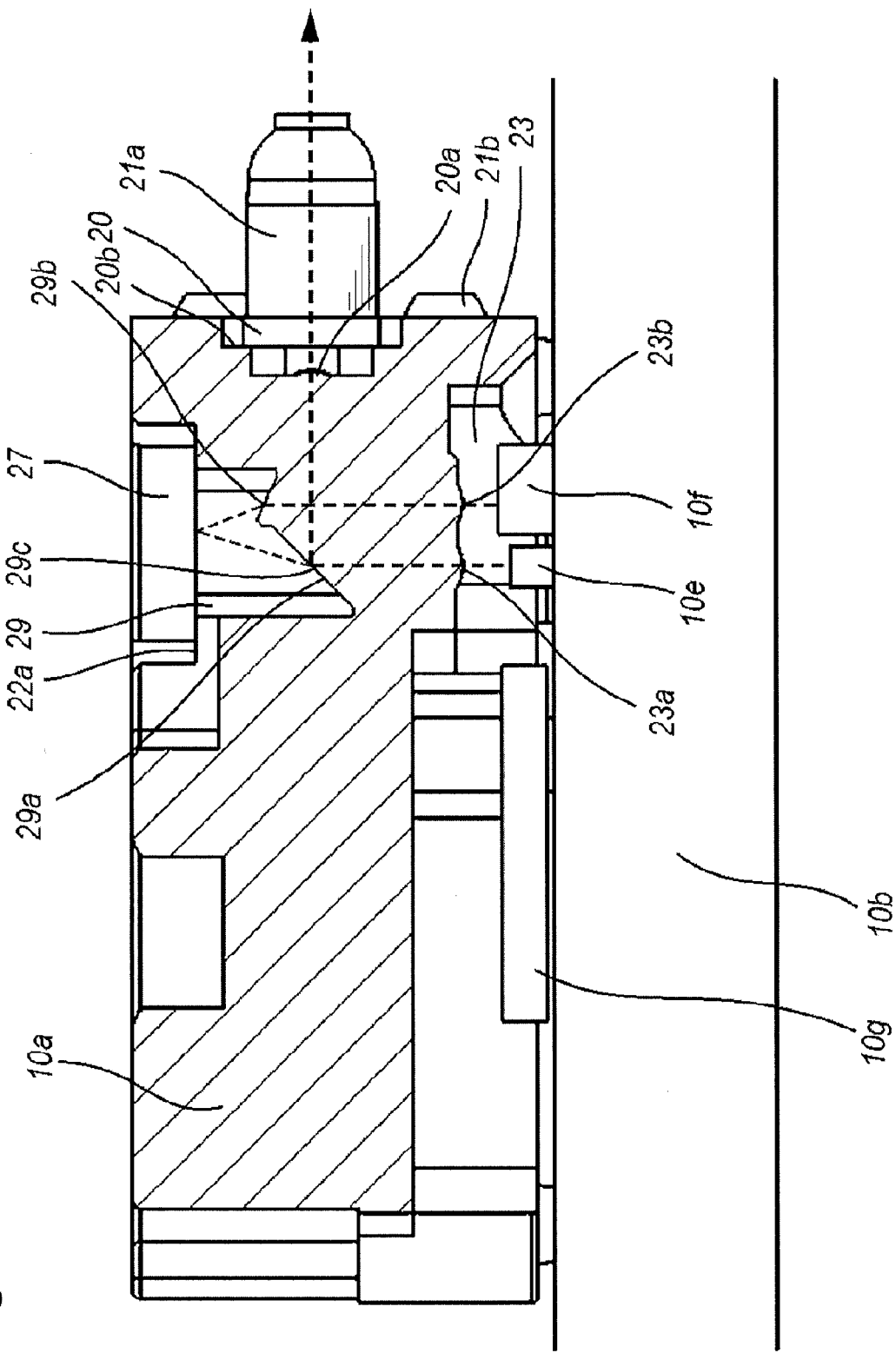
FIG. 4 shows a side cross section of the sub-module, where
Figure 5:
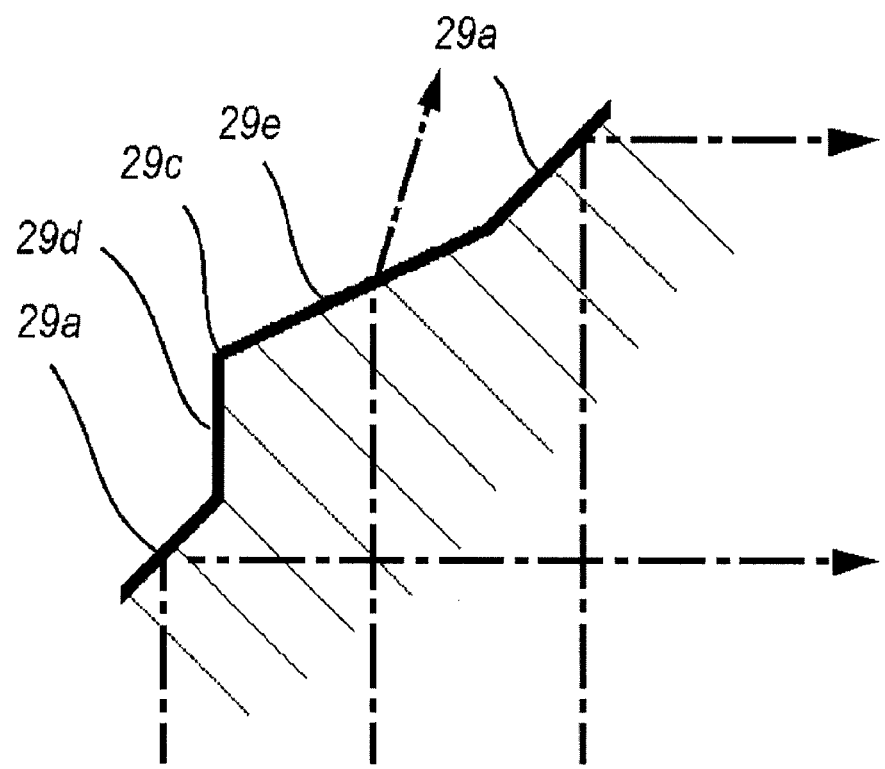
FIG. 5 magnifies a structure around a blip to reflect and refract light coming from the VCSEL.

Next, the optical coupling between the optical devices and the optical fibers will be described as referring to FIGS. 4 and 5. FIG. 4 is a cross section of the resin body 10a and the module substrate 10b mounting the optical devices, 10e to 10g, the electrical devices, 10h and 10j, and the resin body 10a thereon. The optical devices, namely, the VCSELs 10e and the m-PDs 10f are mounted in the first pocket 23 in the front side of the resin body 10a. As indicated by the chain line in FIG. 4, an optical signal emitted vertically from the VCSELs 10e enters the resin body 10a through the lens 23a. As described, the lens 23a is integrally formed in the surface of the resin body 10a. The optical signal entering the resin body 10a is partially reflected by substantially a right angle at the interface 29a toward the optical port 20 and focused by the lens 20a formed at the interface in the optical port 20.

Specifically, the resin body 10a provides a mirror pocket 29 in the top thereof continuous to the third pocket 22 where the mirror 27 is set on the step 22a. The mirror pocket 29 forms two inclined surfaces, 29a and 29b, the former of which is inclined by substantially 45° with respect to the horizontal plane, while, the latter inclined surface 29b makes an angle greater than 90° with respect to the former surface 29a. A portion of the optical single entering the resin body 10a is partially reflected at the surface 29a as described, while, another portion of the optical signal is transmitted through the surface 29a, refracted thereat and advances toward the mirror 27.

The optical signal, which is transmitted through the surface 29a and reflected by the mirror 27, advances toward the second surface 29b and refracted thereat toward the m-PD 10f mounted neighbor to the VCSEL 10e. Because the second surface 29b makes the obtuse angle against the first surface 29a and the axis of the optical signal reflected by the mirror 27 makes an incident angle with respect to the second surface 29b such that the light refracted at the second surface 29b advances toward the m-PD 10f by substantially a right angle. That is, two surfaces, 29a and 29b, the distance between two lenses, 23a and 23b, and the distance from the surfaces, 29a and 29b, to the mirror 27 are set such that the light advancing vertically from the VCSEL 10e enters the m-PD 10e substantially vertically after refracted twice and reflected by the mirror 27.

Referring to FIG. 3A, the mirror 27 has a plane shape of a parallelogram. The third pocket 22 also has a shape of a parallelogram. Accordingly, the mirror 27 is unable to set in the step 22a in top side back. Thus, the plane shape of the mirror 27 and that of the third pocket 22 becomes effective when the mirror 27 provides an optical filter selectively reflecting light with wavelength corresponding to that of the light emitted from the VCSEL 10e.

The resin body 10a of the present embodiment provides a feature in the surface 29a. Referring to FIG. 5, FIG. 5 is a cross section of the first surface 29a and magnifies a portion thereof where the light coming from the VCSEL 10e is reflected and refracted. The blip 29c is formed by two surfaces, one of which 29d is a surface almost vertical to the horizontal top surface of the module substrate 20b, while, the other 29e makes an angle with respect to the horizontal top surface of the module substrate 10b, which is substantially equal to that of the second surface 29b. Specifically, the angle of the surface 29b is selected such that the light coming from the VCSEL causes no total internal reflection, which is smaller than the angle of the surface 29a against the horizontal top surface of the module substrate 10b. Although figures of the present application illustrate that the surface 29d is perpendicular to the horizontal top surface, the surface 29d is unnecessary to be normal to the horizontal top surface. The angle of the surface 29d is selected so as not to cause stray light refracted thereat. Thus, the light coining from the first lens 23a is reflected in a primary portion thereof at the first surface 29a but a substantial part thereof is refracted at the surface 29e of the blip. The surface 29e may be called as the refracting surface; while, the surface 29d is called as the vertical surface. In the present example of the blip 29c, the surface 29e makes an angle of 160° with respect to the first surface, which means that the surface 29e makes an angle of 25° (155°) with respect to the horizontal top surface of the module substrate 10b. Accordingly, the second surface 29b makes the angle of 25° against the top surface of the module substrate 10b. Adjusting the angle of the surface 29e against the first surface 29a and that of the second surface 29b, the distance between the VCSEL 10e and the m-PD 10f is optionally selected. Moreover, the number of the blips 29c in the first surface may control the optical power entering the m-PD 10f. That is, a ratio of the optical power entering the m-PD 10f against that entering the optical fiber may be optionally adjusted by the number of the blips 29c.

Figure 6A:
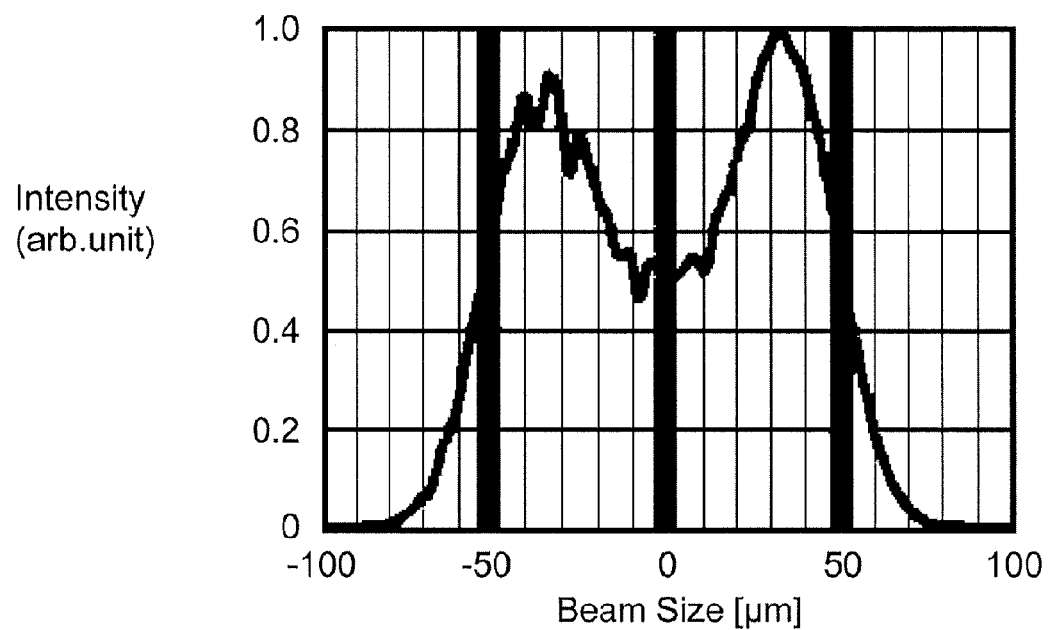
FIGS. 6A and 6B exemplarily indicate positions of the blips.
Figure 6B:
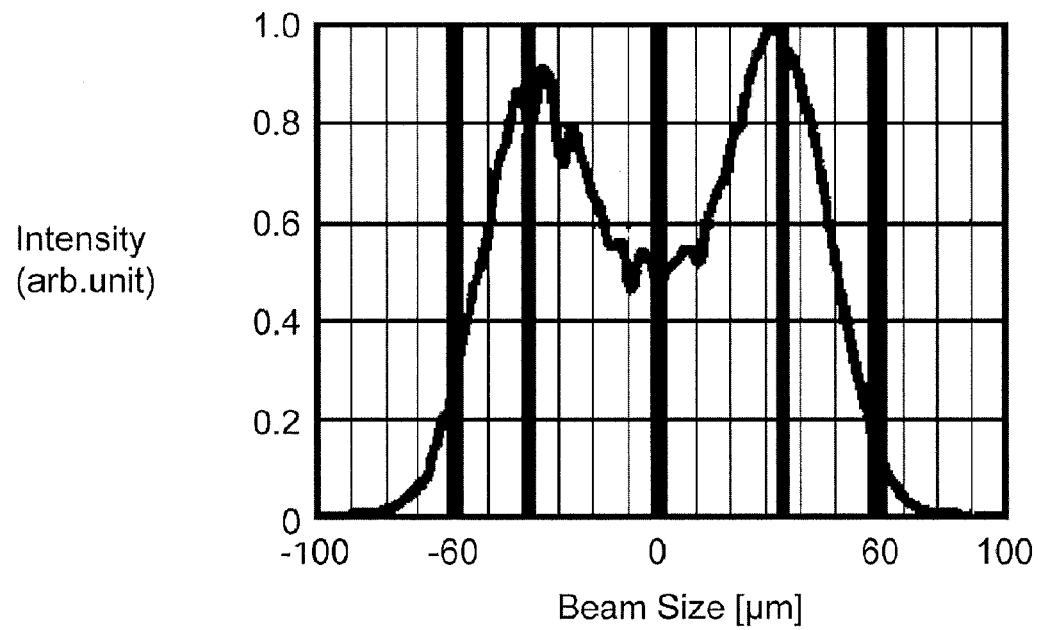

For instance, FIGS. 6A and 6B show arrangements of the blips on the first surface 29a against the optical beam pattern. In FIGS. 6A and 6B, the horizontal axis corresponds to the lateral expansion of the optical beam emitted from the VCSEL 10e by the lens 23a as the center of the horizontal axis; while, the vertical axis corresponds to the relative magnitude of the optical beam. Because the VCSEL 10e has the top electrode with a doughnuts shape through which the optical beams is emitted and the carriers are injected by the doughnuts electrode, the beam pattern causes a dip in the center thereof. In addition, the first lens 23a magnifies the beam such that the beam passing the first lens 23a becomes a collimated beam with a lateral expansion of about 50 µm.

The surface 29e not only refracts the optical beam coming from the VCSEL 10e but also causes inner reflection. However, the surface 29e makes an inclined angle with respect to the axis of the optical beam; accordingly, light inwardly reflected thereat forms an optical axis not coinciding with the axis of the incoming optical beam. Accordingly, the internally reflected light never returns to the VCSEL 10e.

FIG. 6A corresponds to an arrangement where the first surface 29a provides three blips 29c each having a width of 7 µm and a span to the neighbors of 50 µm. As described, the VCSEL 10e on the module substrate 10b is optically aligned with the resin body 10a by the guide pin 24a. No active alignment is carried out. Accordingly, the blips 29c possibly causes offset with respect to the beam pattern. When only the limited number of the blips is provided in the first surface 29a, the blip provided in outer sides may not cover the enough power of the optical beam.

FIG. 6B schematically illustrates the positional relation between the blips and the optical beam. In this example, the first surface 29a provides five blips each having a width of 4 µm and varied distances to the neighbor blips. That is, the first surface 29a of the example provides the center blip in a position corresponding to the center of the lens 23a, the intermediate blips putting the center blip therebetween by a distance of 35 µm, and outer blips with a distance of 25 µm to the intermediate blips. Thus, the distance between the intermediate blip and the outer blip is different from that between the center blip and the intermediate blip. Moreover, as described, the optical beam causes the doughnut field pattern reflecting the shape of the top electrode of the VCSEL, and the intermediate blip in the position thereof corresponds to the peak position of the beam profile. Thus, even the resin body 10a is offset from the position of the optical devices, 10e and 10f, most part of the blips may cover the beam profile.

The resin body 10a may be made of resin having characteristic of, moderate heat resisting property, excellent transparency for light with wavelengths from 850 to 1600 nm, superior fluidity, and good mechanical strength. Polyetherimide or polyethersulfone is a typical material applicable to the resin body 10a by the injection molding.

The first surface 29a without any blips causes the total internal reflection for the light coming from the VCSEL 10e, which causes no refracted beams.

Figure 7:
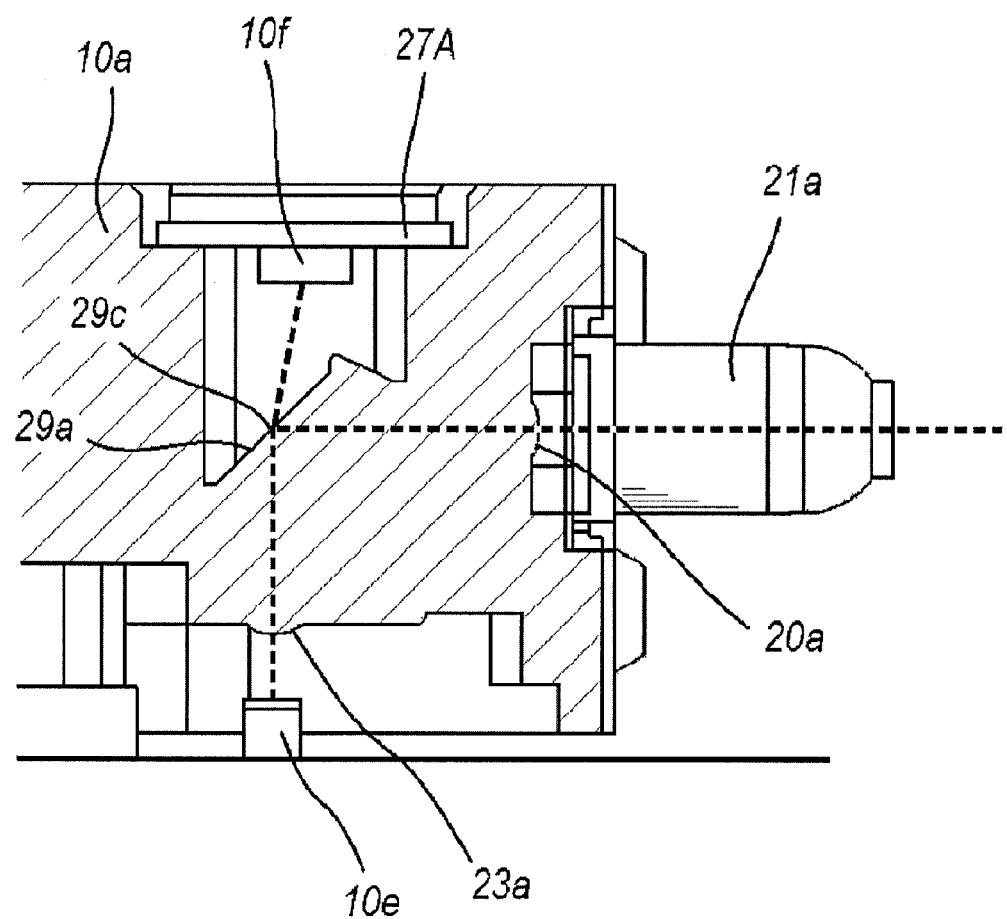
FIG. 7 shows a side cross section of the sub-module according to a modified example of the present invention.

In the foregoing detailed description, the optical module according to the present invention has been described with reference to specific exemplary embodiments thereof. However, it will be evident that various modifications and changes may be made thereto without departing from the broader spirit and scope of the present invention. For instance, referring to FIG. 7, the embodiment described above provides the filter or mirror 27 to reflect the light refracted at the blip 29c toward the PD 10f. However, a support substrate 27A may be set on the step 22a substituting the mirror or the filter 27, and the support substrate 27A may mount the monitor PD 10f in up-side-down arrangement. Moreover, the specification strictly concentrates the VCSEL as a light-emitting device. However, the resin body 10a with the blip 29c does not restrict the light emitting device for a VCSEL. Another arrangement of the light emitting device, such as, for instance, an edge-emitting LD may be installed on the module substrate with the resin body 10a. Thus, the present specification and figures are accordingly to be regarded as illustrative rather than restrictive.

What is claimed is:

1. An optical module, comprising:
   a substrate;
   a semiconductor laser diode (LD) mounted on the substrate;
   a monitor photodiode (PD) mounted on the substrate; and
   a resin body mounted on the substrate, the resin body installing the LD and the monitor PD therein, the resin body providing a mirror surface making an angle of 45° against the substrate to cause a total inner reflection for an optical beam coming from the LD,
   wherein the mirror surface includes at least one refracting surface that makes an angle less than 45° against the substrate, the refracting surface transmitting a portion of the optical beam coming from the LD and entering the mirror surface.

2. The optical module of claim 1,
   wherein the mirror surface further includes a vertical surface extending in perpendicular to the substrate, the vertical surface and the refracting surface forming a triangular cross section.

3. The optical module of claim 2,
   wherein the resin body further includes another refracting surface and a mirror,
   wherein the mirror reflects the optical beam transmitting through the refracting surface toward the another refracting surface.

4. The optical module of claim 3,
   wherein the another refracting surface makes an angle against the substrate substantially equal to the angle of the refracting surface against the substrate, and
   wherein the optical beam refracted at the another refracting surface enters the monitor PD arranged neighbor to the LD.

5. The optical module of claim 3,
   wherein the resin body provides a lens facing the LD, the lens collimating the optical beam coming from the LD.

6. The optical module of claim 3,
   wherein the resin body provides another lens facing the monitor PD, the another lens concentrating the optical beam refracted by the another refracting surface onto the PD.

7. The optical module of claim 3,
wherein the mirror selectively reflects the optical beam having wavelengths corresponding to the LD.

8. The optical module of claim 2,
wherein the resin body further includes a support that mounts the monitor PD thereon.

9. The optical module of claim 1,
wherein the mirror surface includes two or more refracting surfaces,
wherein at least one refracting surface positions in a center of the optical beam of coming from the LD and projected on the mirror surface.

10. The optical module of claim 9,
wherein the refracting surfaces each has a distance to a neighbor refracting surface different from each other.

11. The optical module of claim 1,
wherein the resin body provides a guide pin and the substrate provides a hole that receives the guide pin, the guide pin set within the hole aligning the LD and the monitor PD with the refracting surface.

12. The optical module of claim 1, further comprising one or more other LDs integrally formed with the LD in an arrayed structure, and, one or more other monitor PDs arranged along the arrayed LDs on the substrate,
wherein the refracting surface extends along an arrayed direction of the arrayed LD.

13. The optical module of claim 1,
wherein the LD has a type of a vertical cavity surface emitting laser diode (VCSEL).

\* \* \* \* \*